United States Patent Office 2,956,147
Patented Oct. 11, 1960

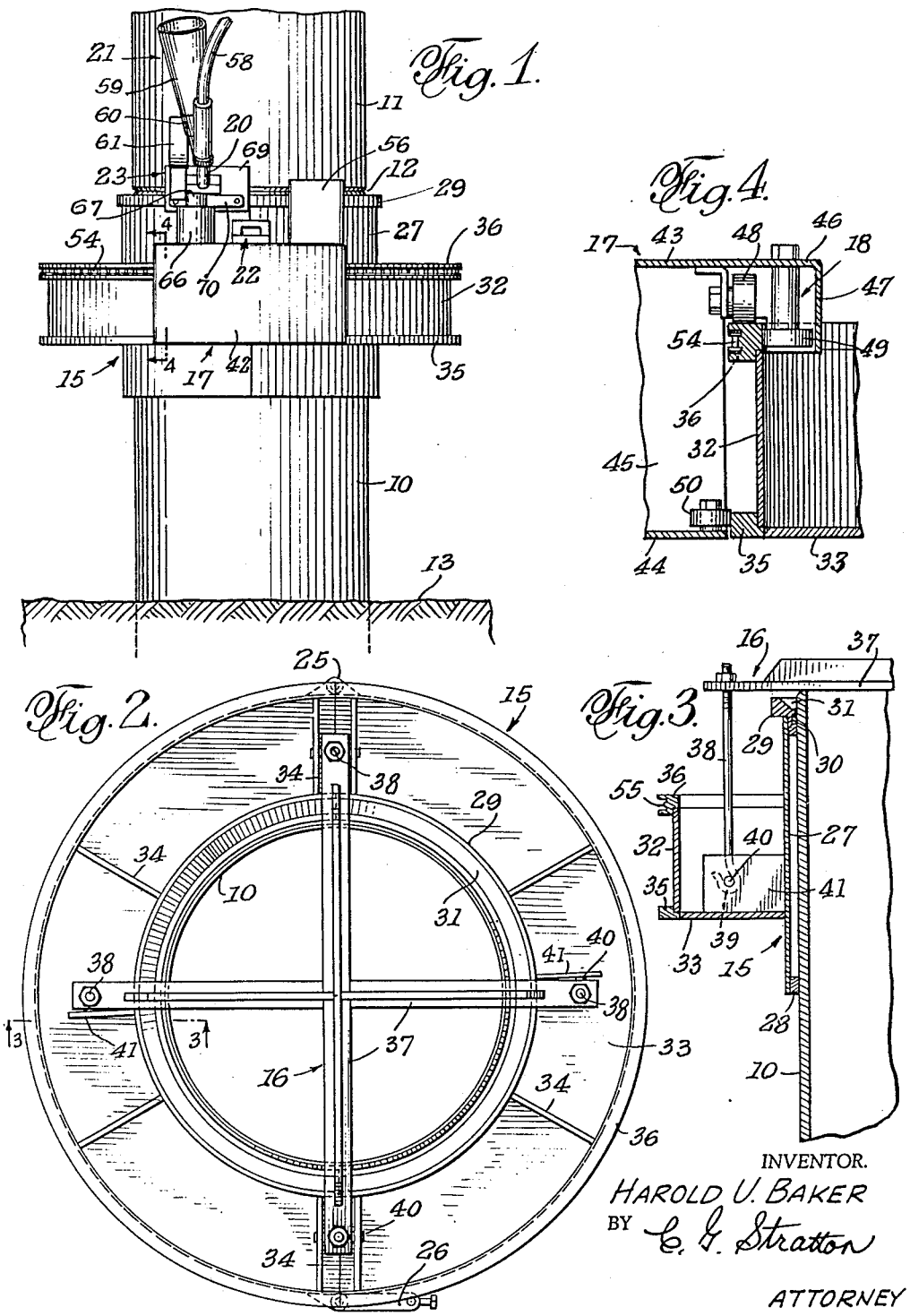

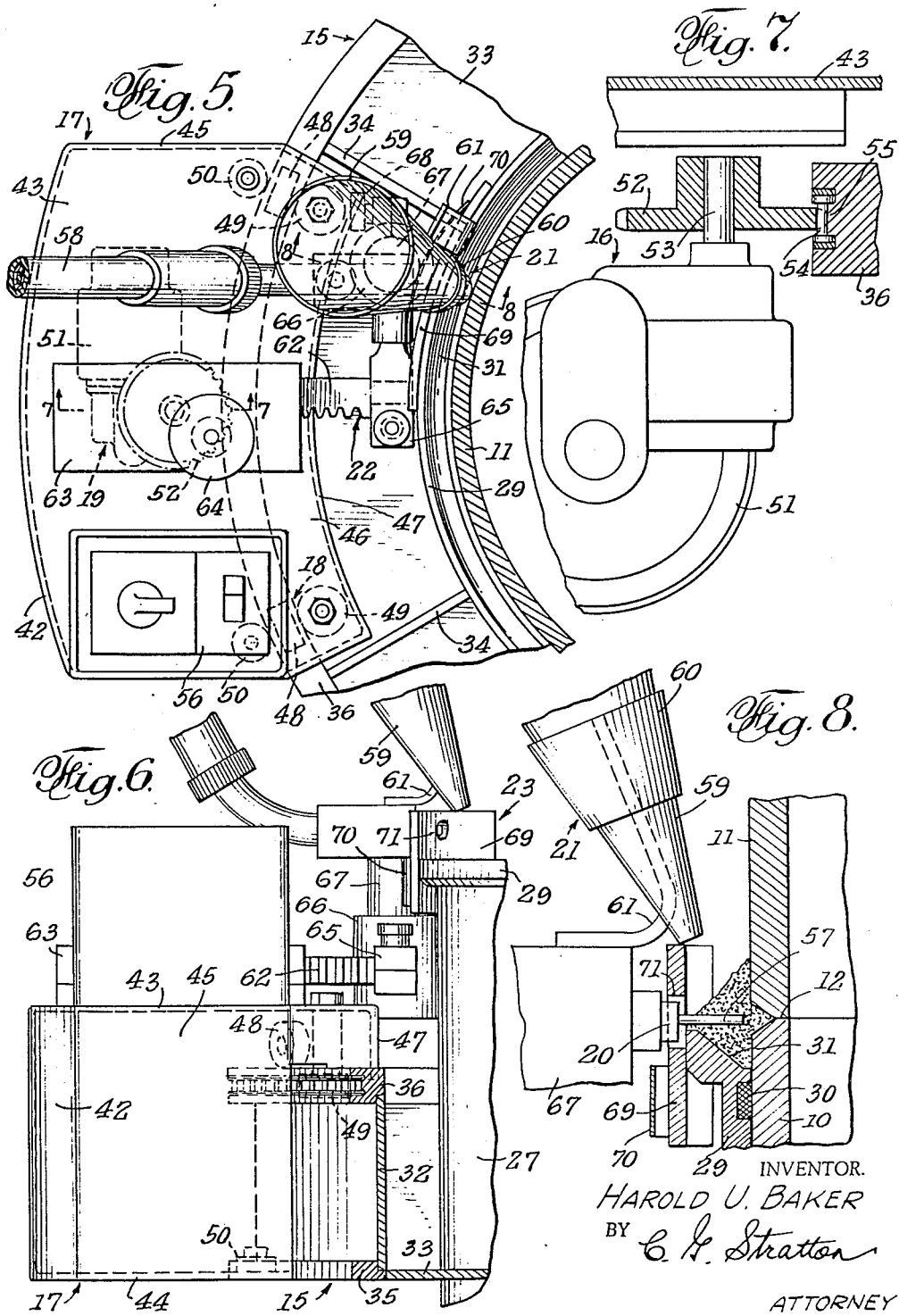

2,956,147

CASING WELDING APPARATUS

Harold U. Baker, South Pasadena, Calif., assignor to Roscoe Moss Company, Los Angeles, Calif., a corporation of California Filed Feb. 24, 1959, Ser. No. 794,988

10 Claims. (Cl. 219—125)

This invention relates to apparatus for welding together end-abutted casings or pipes and deals more particularly with apparatus for weld-connecting pipes in the field.

In the digging of wells of various types, particularly water wells, sections of pipe or casing are driven into the well hole to form a liner. It is usual practice to hand-weld abutting casing sections as additional casing length is required and the well is deepened. It is an object of the present invention to provide novel and improved apparatus for weld-connecting such and similar end-abutted well casing sections.

Another object of the invention is to provide welding apparatus of the character referred to that automatically tracks a welding tip or head accurately around the seam between two end-abutted pipes or tubes while one is partly driven into the ground and, at the same time, provides a continuous supply of flux at the point of weld as the welding tip moves along said seam.

Another object of the invention is to provide novel and improved track means that is adapted to be mounted in operative position on the protruding end of the pipe or casing that is in the ground and serves to guide the path of movement of the welding tip along the seam that is formed between said pipe or casing and a pipe or casing placed thereupon in end-abutment.

A still further object of the invention is to provide means removably connected to said track means that cooperates with the end of the ground-driven casing to locate the latter means in desired relation to said casing end and, thereby, locate the welding tip properly relative to the seam along which the weld is provided.

A yet further object of the invention is to provide apparatus of the type above indicated that includes a carriage that tracks around the mentioned track means, the same providing a mount for the welding tip, the flux providing means and such means, electrical or otherwise, that necessarily attends a welding operation.

Another object of the invention is to provide novel means for moving the carriage so that the same automatically tracks, in a round-about manner, on the track means.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes, one embodiment of the present invention, which is given by way of illustration or example only.

In the drawings, like reference characters designate similar parts in the several views.

Fig. 1 is an elevational view of the present welding apparatus in operative position.

Fig. 2 is an enlarged plan view showing the track means of said apparatus together with means that locates the same relative to the upper end of a ground-driven casing as in Fig. 1.

Fig. 3 is a vertical sectional view as taken on line 3—3 of Fig. 2.

Fig. 4 is an enlarged vertical sectional view as taken on line 4—4 of Fig. 1 and showing means effecting tracking engagement of the track means and carriage of the apparatus.

Fig. 5 is a similarly enlarged plan view of said carriage and components carried thereby, the same being shown on a broken portion of the track means.

Fig. 6 is a side elevational view of said carriage as in Fig. 5.

Fig. 7 is a further enlarged cross-sectional view as taken on the line 7—7 of Fig. 5 and showing means for driving the carriage around the track means.

Fig. 8 is a similarly enlarged detail sectional view as taken on the line 8—8 of Fig. 5 and showing the point of weld and the components effecting the welding operation.

While the present apparatus may have other applications, the same is particularly adapted to connect two casings 10 and 11 in end-abutted relation, as in Figs. 1 and 8 by a seam weld at the seam 12 between said casings. It will be noted that the casing 10 is partly driven into the ground 13 and that the casing 11, after the weld is made, constitutes an upper extension of the casing 10. Thereafter, by percussion, or in other ways, the connected casings are further driven into the ground until the section of casing 11 is in the position now shown for casing 10. Then, if an additional casing is needed for lining the well hole or bore, the same may be provided in the manner above described. Thus, additional sections of casing may be added as the well depth increases. The present apparatus is provided for facilitating the rapid and accurate formation of the seam welds that connect the casings.

The present apparatus comprises, generally, track means 15, means 16 removably connected to said track means for locating the same accurately as desired in operative position on the casing 10, a carriage 17 mounted on the track means, means 18 inter-engaging said track means and carriage to guide the latter, means 19 for driving the carriage in round-about fashion as guided by the means 18, a welding tip 20, means 21 to supply flux to the weld formed by the tip 20, means 22 adjustably mounting said tip 20 and the means 21 on the carriage, and means 23 forming a dam or barrier to retain flux fed by the means 21 at the area of the weld as performed by the tip.

The track means 15 that is illustrated comprises a two-section device that is provided with a section-connecting hinge 25 and a latch 26 that locks the sections together after being placed on the casing 10. Said means comprises a clamp collar 27 that is provided with a lower clamp ring 28 and an upper clamp ring 29, the latter ring being shown as having a gasket 30 that engages the casing 10. As best seen in Fig. 8, the ring 29 has its upper face conically flared to provide an annular trough 31.

Said track means further comprises an outer carriage-mounting annulus 32 that is connected to collar 27 by a floor plate 33 and by radial plates 34. Said annulus 32 is of lesser height than is collar 27 and is preferably located, as shown, to be approximately midway of the upper and lower edges of said collar. A lower annular track 35 and an upper annular track 36 is provided on the annulus 32.

It will be clear that, with the latch 26 open, the sections of the track means may be opened on the hinge 25 and placed and clamped in position on the casing 10.

The means 16 is provided for locating said track means 15 relative to the upper end face of the casing 10.

Said means 16 is shown as a spider 37 having its arms spanning across the clamp collar 27, a set of hanger bolts 38 or the like extending downwardly from the ends of the spider arms and here shown with hook ends 39, and a set of pins 40 or the like that are engaged by the ends 39 and fixedly carried by the plates 34 or by intermediate plates 41. In any case, the spider 37 is connected by the bolts 38 to the track means 15. By adjusting the length of the bolts 38, the clamp collar 29 may be suitably spaced below the top end of casing 10 when the track means is being placed in operative position and the spider 37 is rested upon said casing end. Since the bolts 38 are separably connected to the track means, it is a simple matter to use the spider as a hanger until the track means is clamped in place. Thereafter, the means 16 is removed leaving the track means in proper operative position. As can be seen from Figs. 3 and 8, a preferred relationship of collar 29 and end of casing 10 has the trough 31 lower than said casing end. However, the relationship may be varied by adjusting the effective length of the hanger bolts 38.

The carriage 17 is shown as a housing having an outer wall 42, respective upper and lower walls 43 and 44, and end walls 45. As can be seen from Figs. 4, 5 and 6, the upper wall 43 has an inward extension 46 that is defined by a down-reaching inner wall 47. Thus, wall 43 is wider than lower wall 44.

The means 18 separably connects the above-described carriage with the track means 15. As can be seen from Figs. 4, 5 and 6, said means 18 comprises a pair of rollers 48 carried by the wall 43 adjacent to and inward of the end walls 45 and are engaged with and track over the upper face of the annular track 36, a second pair of rollers 49 carried by the upper wall extension 46 adjacent to rollers 48 and engaging the inner or concave face of the track 36, and a third pair of rollers 50 carried by the lower wall 44 in general alignment with rollers 49 and engaging the outer or convex face of the lower annular track 35. It will be clear, particularly from Fig. 4, that the carriage may be set into place simply by dropping the same over the top of the carriage-mounting annulus 32 with the rollers 49 inward and the rollers 50 outward of said annulus. Anti-friction support is provided by the rollers 48, and it will be evident that the carriage is gravitationally held in place and may track freely and fully around the annulus 32 with the housing of said carriage outward of the annulus 32.

The carriage-driving means 19 is shown as a geared motor 51 that is disposed within the interior of the carriage housing and has a sprocket wheel 52 on the output shaft 53 of said motor. The latter is suitably mounted in fixed position in the housing. Said means 19 further includes a sprocket chain 54 that is positioned, in endless form, within an outwardly facing annular groove 55 provided in the annular track 36. Said sprocket wheel 52 is connected with said chain, and it will be clear that operation of the motor 51 and turning of said sprocket wheel results in the carriage 17 tracking around the track means 15. The carriage movement is a continuous one, and its operation may be controlled in the usual way by controlling the motor 51. Such means is suggested at 56 and is carried by the carriage.

The welding tip 20 may be generally conventional, the same being here shown as the type that includes the central feed of a weld or solder wire or other eutectic material 57. Said tip is shown as on the end of a flexible electric conduit 58 that is connected to conventional welder apparatus. The latter is not shown since the same comprises no part of the present invention and may be of the type used in hand-welding operations.

The flux-supplying means 21 is shown as a hopper 59 that is preferably removably held by a flared collar 60 attached to a bracket 61 in such manner as to direct the powdered flux material therein to the point of weld, preferably immediately above where the solder wire 57 protrudes from the welding tip 20.

The adjustable mounting means 22 is shown as a radially disposed gear rack 62 that operates in a housing 63 provided on the wall 43 of the carriage. Means controlled by a knob 64 provides for manual retraction and extension of the rack 62. A bracket 65 is connected to the end of rack 62 and moves therewith toward and from the casings 10 and 11 as the knob 64 is manipulated. The welding tip 20 and the bracket 61 of the flux-supplying means 21 are carried by said bracket 65 and partake of the above-mentioned adjustability of said bracket. In addition to said adjustment radially, the tip 20 and means 21 are adapted to be adjusted vertically as well. To this end, the bracket is shown with a housing part 66 in which is telescopically fitted a stem member 67. A knob control 68, through the medium of a rack and pinion arrangement, or in any other suitable way, may be provided to vertically adjust the stem member 67. The adjustment may be self-locking or be locked by clamping the member 67 in the housing part 66 by constriction of the latter.

It will be evident that the tip 20 and means 21 may be retracted while the carriage is being placed on or removed from the track means and that the same may be projected to operative position, as in Figs. 5, 6 and 8 when a welding operation is to be instituted. The vertical adjustment assures ability of bringing the weld or solder wire 57 directly to the seam 12. Ordinarily, this adjustment is not required to be made if the mounting of the track means on the casing has been accurately accomplished.

The means 23 is adjustable with the welding tip and is shown as comprising an arcuate plate 69 that is secured, as to stem member 67, through a bowed spring 70. The curvature of plate 69 conforms to that of the outer face of clamp ring 29. Said plate is provided with a hole 71 through which weld rod 57 extends. Since the spring 70 provides a resilient mount for the plate 69, the same is adapted to be compressed as the plate achieves contact with said ring 29. As a consequence, said plate and ring have an intimate resilient engagement during traction of the carriage around the track means. Since the flux material, in powder form, is fed over the top edge of plate 69 (see Fig. 8) to fill the trough 31, a resilient dam that holds said material in place while welding is being effected is provided by the above described construction. It will be clear that such dam moves with the welding tip and that after the weld has been made at any given point, residual flux may fall away or be brushed or air-dislodged from the area of the weld.

One complete traversal of the carriage should, ordinarily, complete a properly welded seam and the rapidity with which the same may be accomplished should be clearly evident. After satisfactory welding of the seam, the carriage is first removed from the track means and, then, the latter is removed from the casing by opening the hinged sections thereof. Now, the casing may be driven further, as required.

While the foregoing specification illustrates and describes what I now contemplate to be the best mode of carrying out my invention, the construction is, of course, subject to modification without departing from the spirit and scope of my invention. Therefore, I do not desire to restrict the invention to the particular form of construction illustrated and described, but desire to cover all modifications that may fall within the scope of the appended claims.

Having thus described my invention, what is claimed and desired to be secured by Letters Patent is:

1. Casing welding apparatus comprising a track for encircling a casing, means to span across an end of the casing encircled by the track and to rest upon said casing end, means to separably connect the track and the spanning means to locate said track in longitudinally spaced relation to said casing end, and means to releasably lock the track to the casing.

2. Apparatus according to claim 1 in which the spanning means comprises a spider having arms that extend beyond the outside of a casing on which rested, and the means to separably connect the track and the spanning means extend from the ends of said spider arms.

3. Apparatus according to claim 1 in which the spanning means comprises a spider having arms that extend beyond the outside of a casing on which rested, the means to separably connect the track and the spanning means extend from the ends of said spider arms, and means to adjust the connecting means between the track and the spanning means to vary the longitudinal distance between the track and the spider means to, thereby, locate the track in desired spaced relation to the casing end.

4. Casing welding apparatus comprising, in combination, a split clamp provided with an enlarged annular track and adapted to be clamped around a vertical casing below the upper end face of said casing, a carriage mounted on said track, means on the carriage and engaged with the track to guide the former for round-about movement relative to said casing, means carried by the carriage to weld together said casing end and the abutting end of a second casing positioned on or in aligned register with the first casing along the annular seam where said casings abut, means carried by the carriage and in driving engagement with the track to continuously move the carriage in round-about fashion to form a continuous weld along said seam, and means connecting the welding means and the carriage for retraction and projection of the welding means relative to the annular line of the seam.

5. Casing welding apparatus comprising, in combination, a split clamp provided with an enlarged annular track and adapted to be clamped around a vertical casing below the upper end face of said casing, removable means connected to the track to engage said upper end of the casing during mounting application of the track to the casing to locate the track relative to the casing end as desired, a carriage mounted on said track, means on the carriage and engaged with the track to guide the former for round-about movement relative to said casing, means carried by the carriage to weld together said casing end and the abutting end of a second casing positioned on or in aligned register with the first casing along the annular seam where said casings abut, means carried by the carriage and in driving engagement with the track to continuously move the carriage in round-about fashion to form a continuous weld along said seam, and means connecting the welding means and the carriage for retraction and projection of the welding means relative to the annular line of the seam.

6. Casing welding apparatus comprising, in combination, a split clamp provided with an enlarged annular track and adapted to be clamped around a vertical casing below the upper end face of said casing, a carriage mounted on said track, means on the carriage and engaged with the track to guide the former for round-about movement relative to said casing, means carried by the carriage to weld together said casing end and the abutting end of a second casing positioned on or in aligned register with the first casing along the annular seam where said casings abut, means carried by the carriage and in driving engagement with the track to continuously move the carriage in round-about fashion to form a continuous weld along said seam, means connecting the welding means and the carriage for retraction and projection of the welding means relative to the annular line of the seam, and a flux-damming plate carried by the last-mentioned means and movable with the welding means between a retracted position and a projected flux-damming position relative to said annular line of the dam.

7. The combination according to claim 6 in which resilient means is provided biasing the mentioned plate toward said seam, said latter means yielding upon engagement of the damming plate with the clamp to provide a resilient sliding engagement of plate and clamp.

8. Casing welding apparatus comprising a combined clamp and track device constituting an annulus around the projecting end of a ground-embedded casing, a carriage engaged with and mounted to track around the track portion of said device, a welding tip and means to supply flux both carried by the carriage and both directed toward the seam defined between the top of said casing and the lower abutting end of a second casing disposed on top of the ground-embedded casing, and a flux-damming plate apertured for the welding tip and comprising a member to retain flux in the area of the tip and covering said seam.

9. Casing welding apparatus according to claim 8 in which the clamp is provided with an upper annular trough to receive flux, and the damming plate engages the clamp to form a barrier heightening said trough in the vicinity of the welding tip.

10. Casing welding apparatus according to claim 8 in which the clamp is provided with an upper annular trough to receive flux, and the damming plate engages the clamp to form a barrier heightening said trough in the vicinity of the welding tip, and means resiliently mounting said plate.

References Cited in the file of this patent
UNITED STATES PATENTS

| | | |
|---|---|---|
| 2,013,630 | Goldsborough | Sept. 3, 1935 |
| 2,227,194 | Moise et al. | Dec. 31, 1940 |
| 2,795,689 | McNutt | June 11, 1957 |